April 13, 1954  C. H. H. RODANET  2,675,026
PRESSURE-GAUGE DIAPHRAGM ADJUSTING DEVICE
Filed May 11, 1950
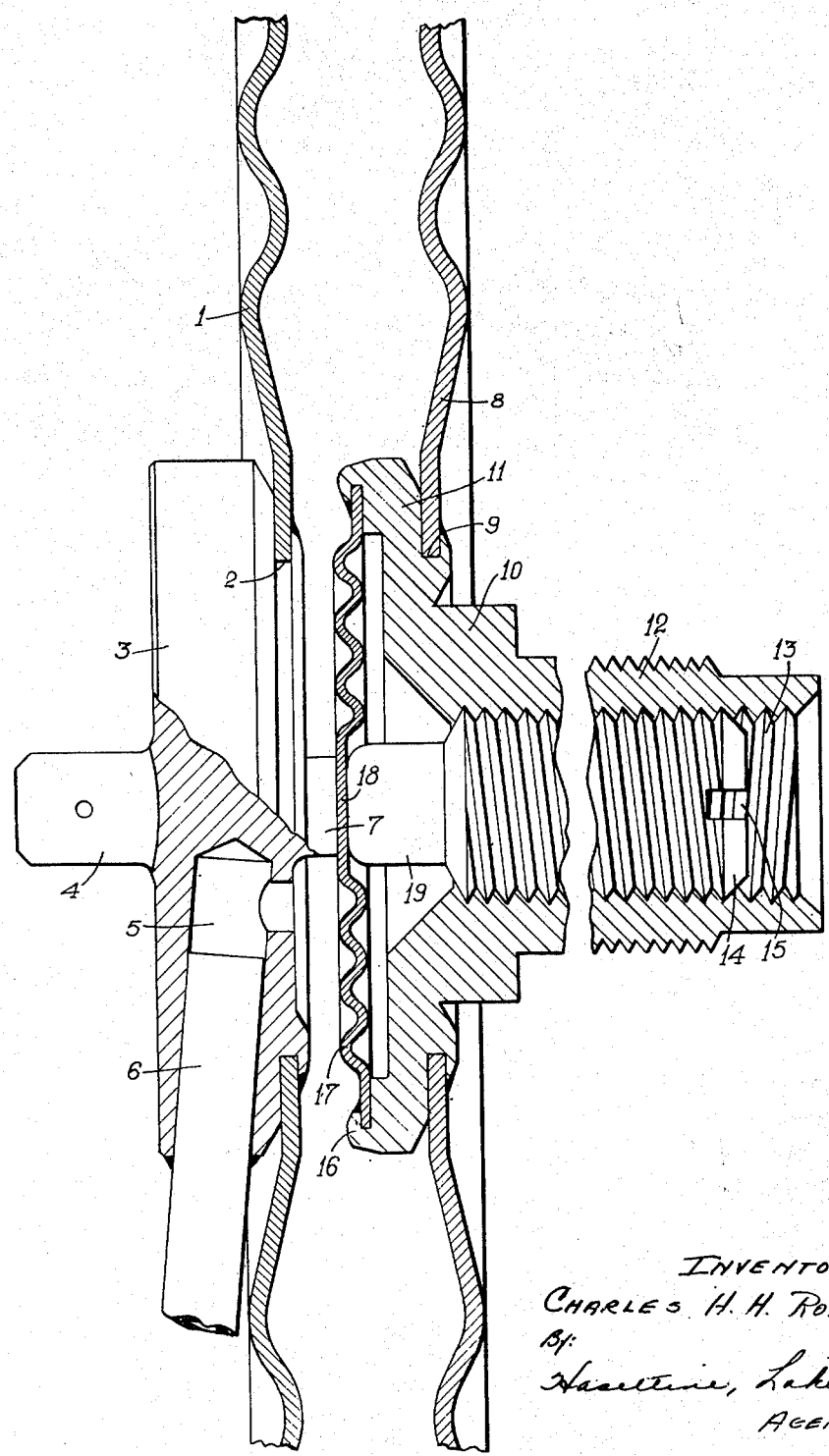
INVENTOR
CHARLES H. H. RODANET
By:
Haseltine, Lake & Co.
AGENTS Patented Apr. 13, 1954

2,675,026

UNITED STATES PATENT OFFICE 2,675,026

PRESSURE-GAUGE DIAPHRAGM ADJUSTING DEVICE

Charles Hilaire Henri Rodanet, Neuilly-sur-Seine, France, assignor to Société Anonyme Etablissements Ed. Jaeger, Levallois-Perret, Seine, France Application May 11, 1950, Serial No. 161,374

Claims priority, application France May 12, 1949

2 Claims. (Cl. 137—787)

Pressure-gage diaphragms having one element consisting of a pair of adjacent flexible membranes must be protected against undue deformations when they undergo too high pressures. In the particular case of pressure-gage diaphragms of the kind used in the manufacture of precision altimeters the sheet material which forms the diaphragm walls should be as thin as possible in order to keep the sensitiveness of the apparatus within acceptable limits.

In the case of aviation altimeters it is difficult to construct single-diaphragm apparatus for a 0–60,000 ft. graduation if both sensitiveness and invariability of indications are desired. In fact, a pressure-gage providing the desired degree of sensitiveness at low altitudes may undergo excessive deformations at high altitudes unless suitable check means are fitted thereon in order to keep these deformations within normal limits. In this case, these check means are placed outside the diaphragm and offer no particular constructional difficulties.

On the contrary, a diaphragm having the desired sensitiveness at high altitudes may become exaggeratedly deformed at low altitudes.

The main object of this invention is to provide, in diaphragms sensitive to high altitudes, internal check means adapted to restrict the movement toward each other of the diaphragm-forming pair of flexible membranes. Thus, the deformations applied to the diaphragm will be limited in the contraction sense and in no circumstance exceed deformation values lying within the natural resiliency of the metal of which the diaphragm is made.

Another object of the present invention is to provide an adjustable check means for regulating the contraction of pressure-gage diaphragms of the type described, wherein the contraction-limiting member is provided with adjusting means which may be actuated from the outside, this adjusting device being made fluid-tight by the interposition, between the fixed portion of the check means fast with one of the diaphragm membranes and the movable portion of the check means, of an auxiliary flexible membrane connected in a fluid-tight manner to the diaphragm wall. The movable portion of the check means consists of the tip of a screw adapted to engage an internally screw-threaded socket soldered on the wall of the diaphragm, the inner end of this socket forming a dished element in which the auxiliary flexible membrane is fixed.

With this means it becomes possible to adjust the lower altitude limit at which the altimeter begins to operate. By using diaphragms arranged in the above-defined manner it is now possible to provide altimeters operating between two predetermined altitude or pressure limits.

A clearer understanding of the invention will be had from the following description of a practical embodiment thereof illustrated diagrammatically by way of example in the accompanying drawing, the single figure of which shows a fragmentary sectional view of the central portion of a pressure-gage diaphragm fitted with the adjustable check means which forms the main feature of the present invention.

One flexible membrane 1 of the pair of membranes forming a pressure-gage diaphragm has a central aperture 2 in which a member 3 is fitted and soldered. This member 3 is formed with a pin 4 for connection with an indicating mechanism (not shown), and with a conduit 5 leading to one side of the member and having pressed and soldered therein a pipe 6 through which vacuum is created inside the diaphragm in the known manner. On its side turned internally of the diaphragm, member 3 is further formed with a central portion 7 acting as check member.

The other flexible membrane 8 of the diaphragm has also a central aperture 9 in which a socket 10 is fixed and soldered as shown. This socket 10 is provided with a dished portion 11 facing the interior of the diaphragm and an externally screw-threaded sleeve portion 12 projecting to the outside and having internal screw-threads 13 engageable by an adjusting screw 14. The head of this screw is slotted at 15 for permitting to introduce a suitable tool therein in order to carry out the necessary adjustments as will be made clear presently.

The dished portion 11 has an edge 16 flanged and soldered on a flexible membrane 17. This membrane has a central flat area 18 positioned in front of the check member 7 and receiving the abutting end or check head 19 of screw 14 which is coaxial to check member 7.

This apparatus operates as follows:

When screw 14 is screwed in or out its check head 19 is moved axially toward or away from the auxiliary membrane 17 so as to more or less deform it. It is therefore possible to vary the distance between member 3 and dished portion 11. The inner space between the main membranes 1 and 8 is therefore kept sealed since it is completely closed by membrane 17.

With this arrangement it will be thus possible to effect a pre-adjustment of the gap between membranes 1 and 8 by actuating screw 14 so that below a given pressure, the value of which may be adjusted at will, check member 7, membrane 17 and screw check head 19 will remain in contact in the order named.

This diaphragm may be advantageously fitted in a precision altimeter of a kind giving its first indications from an altitude determined in an adjustable manner.

It will be understood that many modifications may be brought to the embodiment described above and illustrated in the accompanying drawing, without departing from the spirit and scope of the invention.

What I claim is:

1. In a pressure responsive indicating instrument of the type comprising a pair of flexible membranes forming a diaphragm having a high sensitiveness at high altitudes, one of said membranes carrying a pin for connecting the same with an indicating mechanism; the improvement which comprises a check member formed on the connecting pin and projecting internally of the diaphragm, a tapped socket member attached on the other membrane in alignment with said check member, an adjusting screw engaging said tapped socket member and formed with a check head facing said check member, and means for sealing in a fluid-tight manner the connection between said socket and said screw, whereby the deformations applied to the diaphragm in the contraction sense are previously limited by the adjustment of said adjusting screw.

2. In a pressure responsive indicating instrument of the type comprising a pair of flexible membranes forming a diaphragm having a high sensitiveness at high altitudes, one of said membranes carrying a pin for connecting the same with an indicating mechanism; the improvement which comprises a check member formed on the connecting pin and projecting internally of the diaphragm, a tapped socket member attached on the other membrane in alignment with said check member, an adjusting screw engaging said tapped socket member and formed with a check head facing said check member, and a flexible membrane soldered to said socket member and interposed between said check member and the check head formed on said adjusting screw, whereby the deformations applied to the diaphragm in the contraction sense are previously limited by the adjustment of said adjusting screw while the connection between the socket and the adjusting screw is sealed in a fluid-tight manner.

References Cited in the file of this patent

UNITED STATES PATENTS

| Number | Name | Date |
|---|---|---|
| 1,485,792 | McKay | Mar. 4, 1924 |
| 1,901,740 | Feeley | Mar. 14, 1933 |
| 2,235,110 | Ottley | Mar. 18, 1941 |